United States Patent
Hartenstine et al.

(10) Patent No.: US 7,044,497 B2
(45) Date of Patent: May 16, 2006

(54) FOLDABLE STROLLER

(75) Inventors: Curtis M. Hartenstine, Birdsboro, PA (US); Robert T. Pike, Reading, PA (US)

(73) Assignee: Graco Children's Products Inc., Exton, PA (US)

( * ) Notice: Subject to any disclaimer, the term of this patent is extended or adjusted under 35 U.S.C. 154(b) by 0 days.

(21) Appl. No.: 10/263,469

(22) Filed: Oct. 3, 2002

(65) Prior Publication Data

US 2003/0080536 A1 May 1, 2003

Related U.S. Application Data

(63) Continuation-in-part of application No. 09/567,096, filed on May 8, 2000, now Pat. No. 6,478,327.

(51) Int. Cl.
*B62B 7/10* (2006.01)
(52) U.S. Cl. ....................... 280/642; 297/130
(58) Field of Classification Search ............... 280/642, 280/643, 644, 647, 650, 657, 47.38, 47.39, 280/47.4; 297/130
See application file for complete search history.

(56) References Cited

U.S. PATENT DOCUMENTS

| | | | |
|---|---|---|---|
| 2,616,719 A | 11/1952 | Heideman |
| 2,783,053 A | 2/1957 | Sheldrick et al. |
| 3,112,042 A | 11/1963 | Leshner |
| 3,168,330 A | 2/1965 | Smith et al. |
| 3,459,435 A | 8/1969 | Garner |
| 3,504,926 A | 4/1970 | Glaser |
| 3,556,546 A | 1/1971 | Garner |
| 4,023,825 A | 5/1977 | Kassai |
| 4,046,401 A | 9/1977 | Kassai |
| 4,111,454 A | 9/1978 | Kassai |
| 4,126,331 A | 11/1978 | Sloan et al. |
| 4,191,397 A | 3/1980 | Kassai |
| 4,232,897 A | 11/1980 | Maclaren, deceased et al. |
| 4,248,443 A | 2/1981 | Ohlson |
| 4,317,581 A | 3/1982 | Kassai |
| 4,335,900 A | 6/1982 | Fleischer |
| 4,362,315 A | 12/1982 | Kassai |
| 4,412,688 A | 11/1983 | Giordani |
| 4,415,180 A | 11/1983 | Payne, Jr. |
| 4,542,915 A | 9/1985 | Wheeler, III et al. |
| 4,564,212 A | 1/1986 | Orlandino et al. |
| 4,606,550 A | 8/1986 | Cone |
| 4,610,460 A | 9/1986 | Kassai |
| 4,632,420 A | 12/1986 | Miyagi |
| 4,632,421 A | 12/1986 | Shamie |
| 4,660,850 A | 4/1987 | Nakao et al. |
| 4,706,986 A | 11/1987 | Kassai |
| 4,741,056 A | 5/1988 | Kassai |

(Continued)

FOREIGN PATENT DOCUMENTS

DE 198 33 857 A1 2/1999

(Continued)

*Primary Examiner*—Jeff Restifo
(74) *Attorney, Agent, or Firm*—Lempia IP Group, LLC (57) ABSTRACT

A stroller has a retractable canopy frame, which can be accomplished by mounting the canopy frame to a seat support frame extending rearwardly beyond the pivoting connection to the stroller rear legs. The stroller also has a remote hinge-lock actuator incorporated into an upper tray connected between the push arm portion of the stroller frame. The stroller also has an infant carrier securing mechanism that allows the infant car carrier to be attached to the stroller and provide at least two tilt positions.

12 Claims, 8 Drawing Sheets

U.S. PATENT DOCUMENTS

| | | | |
|---|---|---|---|
| 4,741,551 | A | 5/1988 | Perego |
| 4,763,911 | A | 8/1988 | Gebhard et al. |
| 4,763,919 | A | 8/1988 | Nakao et al. |
| 4,768,795 | A | 9/1988 | Mar |
| 4,770,437 | A | 9/1988 | Glaser |
| 4,817,982 | A | 4/1989 | Kassai |
| 4,819,958 | A | 4/1989 | Perego |
| 4,832,361 | A | 5/1989 | Nakao et al. |
| 4,856,809 | A | 8/1989 | Kohus et al. |
| 4,886,289 | A | 12/1989 | Yee et al. |
| 4,892,327 | A | 1/1990 | Cabagnero |
| 4,907,818 | A | 3/1990 | Chai |
| 4,924,725 | A | 5/1990 | Takahashi et al. |
| 4,930,697 | A | 6/1990 | Takahashi et al. |
| 4,953,887 | A | 9/1990 | Takahashi et al. |
| 5,056,805 | A | 10/1991 | Wang |
| 5,074,575 | A | 12/1991 | Bigo |
| 5,087,066 | A | 2/1992 | Mong-Hsing |
| 5,110,150 | A | 5/1992 | Chen |
| 5,143,398 | A | 9/1992 | Teng |
| 5,181,735 | A | 1/1993 | Onishi |
| 5,184,835 | A | 2/1993 | Huang |
| 5,201,535 | A | 4/1993 | Kato et al. |
| 5,203,577 | A * | 4/1993 | Kato et al. .................... 280/30 |
| 5,205,577 | A | 4/1993 | Liu |
| 5,244,228 | A | 9/1993 | Chiu |
| 5,246,272 | A | 9/1993 | Kato et al. |
| 5,257,799 | A | 11/1993 | Cone et al. |
| 5,362,089 | A | 11/1994 | Jyan-Tsai |
| 5,388,852 | A | 2/1995 | Bigo et al. |
| 5,417,450 | A | 5/1995 | Wang |
| 5,427,402 | A | 6/1995 | Huang |
| 5,454,584 | A | 10/1995 | Haut et al. |
| 5,460,398 | A | 10/1995 | Huang |
| 5,472,224 | A | 12/1995 | Jane Cabagnero |
| 5,478,102 | A | 12/1995 | Haung |
| 5,490,685 | A * | 2/1996 | Kitayama et al. ........ 280/47.38 |
| 5,511,441 | A | 4/1996 | Arai |
| 5,513,864 | A * | 5/1996 | Huang .................... 280/47.36 |
| 5,524,503 | A | 6/1996 | Ishikura |
| 5,605,409 | A | 2/1997 | Haut et al. |
| 5,622,377 | A | 4/1997 | Shamie |
| 5,645,293 | A | 7/1997 | Cheng |
| 5,664,795 | A | 9/1997 | Haung |
| 5,669,623 | A | 9/1997 | Onishi |
| 5,676,386 | A | 10/1997 | Huang |
| 5,718,444 | A | 2/1998 | Huang |
| 5,722,682 | A | 3/1998 | Wang |
| 5,727,798 | A | 3/1998 | Walters et al. |
| 5,738,410 | A * | 4/1998 | Stroud et al. .......... 297/354.12 |
| 5,765,855 | A | 6/1998 | Chiu |
| 5,765,856 | A | 6/1998 | Kiser |
| 5,769,447 | A | 6/1998 | Huang |
| 5,772,279 | A * | 6/1998 | Johnson, Jr. ................. 297/130 |
| 5,775,718 | A | 7/1998 | Huang |
| 5,795,091 | A * | 8/1998 | Kakuda et al. ............. 403/325 |
| 5,845,666 | A | 12/1998 | Messner |
| 5,845,924 | A | 12/1998 | Huang |
| 5,865,447 | A * | 2/1999 | Huang ........................ 280/30 |
| 5,876,046 | A * | 3/1999 | Courtney et al. ............. 280/30 |
| 5,876,057 | A * | 3/1999 | Huang ........................ 280/642 |
| 5,882,030 | A * | 3/1999 | Haut .......................... 280/642 |
| 5,887,935 | A | 3/1999 | Sack |
| 5,938,229 | A * | 8/1999 | Chen et al. ................. 280/642 |
| 5,947,555 | A | 9/1999 | Welsh, Jr. et al. |
| 5,979,928 | A | 11/1999 | Kuo |
| 5,988,669 | A | 11/1999 | Freese et al. |
| 6,070,890 | A | 6/2000 | Haut et al. |
| 6,116,624 | A | 9/2000 | Hu |
| 6,139,046 | A | 10/2000 | Aalund et al. |
| 6,155,740 | A | 12/2000 | Hartenstine |
| 6,273,451 | B1 | 8/2001 | Julien et al. |
| 6,286,844 | B1 * | 9/2001 | Cone, II et al. ......... 280/47.41 |
| 6,331,032 | B1 * | 12/2001 | Haut et al. .................. 297/130 |
| 6,368,006 | B1 | 4/2002 | Yang et al. .................... 403/84 |
| 6,409,205 | B1 * | 6/2002 | Bapst et al. ................. 280/642 |
| 6,446,990 | B1 * | 9/2002 | Nania et al. ............ 280/47.371 |
| 6,478,327 | B1 * | 11/2002 | Hartenstine et al. ........ 280/642 |
| 2003/0094791 | A1 * | 5/2003 | Hartenstine et al. ........ 280/642 |
| 2003/0168833 | A1 * | 9/2003 | Chen .......................... 280/642 |

FOREIGN PATENT DOCUMENTS

| | | |
|---|---|---|
| DE | 299 10 986 U1 | 10/1999 |
| EP | 0 901 953 A2 | 3/1999 |
| EP | 0 994 004 A2 | 4/2000 |
| WO | WO 00/06437 | 2/2000 |

* cited by examiner

FOLDABLE STROLLER

This application is a continuation-in-part of and claims benefit of application Ser. No. 09/567,096, filed May 8, 2000 now U.S. Pat. No. 6,478,327, the disclosure of which is incorporated herein by reference.

BACKGROUND

Foldable strollers, such as disclosed in U.S. Pat. No. 5,511,441 issued to Arai; U.S. Pat. No. 5,181,735 issued to Onishi; U.S. Pat. No. 4,953,887 issued to Takahashi, et al.; and U.S. Pat. No. 6,155,740 issued to Hartenstine, have an articulated stroller frame that allows the stroller to fold from its use configuration to its collapsed configuration. These strollers include soft goods made of fabric, such as a seat, back support, canopy, storage basket, etc., covering parts of the stroller frame. The back support can be movably configured between a sitting position and a recumbent or lying position. These strollers also have left- and right-side hinge locks, between the respective left- and right-side push arms of the handlebar frame and the left- and right-side rear legs, to maintain the stroller in the operating configuration.

In such strollers, and other foldable strollers, the canopy frame or bow is typically attached to the push arms or the hinge locks. Consequently, the position of the canopy frame, relative to the push arms, remains fixed at all times, between its open position and its closed position. When the stroller is folded, the canopy frame is at its closed position. But since the canopy frame position is fixed relative to the push arms, if a relatively large canopy is used, the canopy frame can protrude beyond the handlebar. Particularly since a larger canopy is desirable to protect infants from exposure to sunlight, the stroller can become bulkier. Accordingly, there is a need for a stroller that can be made more compact, particularly with the use of a larger canopy.

Further, it is desirable for the stroller to have ergonomically correct handlebar, which typically is the cross bar member extending across the push arms, for comfort and control. For added comfort to the caretaker, the handlebar angle can be adjusted relative to the push arms, as disclosed, for example in U.S. Pat. No. 5,184,835 issued to Huang and U.S. Pat. No. 5,056,805 issued to Wang. Including such an adjustable handlebar, however, makes it more difficult to provide a remote hinge-lock actuator on the handlebar, which typically needs a Bowden cable or similar arrangements to allow for the handlebar to rotate without actuating the hinge locks. In this respect, U.S. Pat. No. 5,775,718 discloses a simple, cable operated remote hinge-lock actuator positioned adjacent to the handlebar. It would be desirable to incorporate a simple cable-operated remote hinge-lock actuator into the existing structure.

Moreover, it would be desirable for the stroller to carry an infant car carrier. While many different configurations for that purpose have been contemplated, there still remains a need for a stroller that is configured to secure an infant car carrier in two or more reclined or tilted positions.

The present invention addresses these needs.

SUMMARY

The present invention is drawn to a stroller. According to one aspect of the present invention, the stroller can have a retractable canopy, which can be accomplished by mounting the canopy frame to a seat support frame or basket frame extending rearwardly beyond the pivoting connection to the stroller rear legs. According to another aspect of the present invention, the stroller can have a remote hinge-lock actuator incorporated into an upper or parent tray formed between its push bar arms. According to another aspect of the present invention, the stroller can have an infant carrier securing mechanism that allows the infant car carrier to be attached to the stroller and provide at least two tilt positions.

A foldable stroller can comprise a foldable stroller frame convertible between an operating position and a folded position. The stroller frame can have front left, front right, rear left, and rear right legs, a handlebar frame pivotally connected to the rear left and right legs, and a seat support frame pivotally connected to the front left and right legs and rear left and right legs. The seat support frame has a portion that pivots downwardly when the frame is folded.

The stroller frame can further include left and right hinge locks fixedly mounted respectively to the rear left and right legs. The ends of the handlebar frame can be pivotally connected to the left and right hinge locks.

The stroller frame can further include a tray assembly comprising a front tray and left and right side arms connected to the front tray. The left and right side arms can be pivotally connected to the handlebar frame. The front and rear left and right legs can be pivotally connected to the left side arm, and the front and rear right legs can be pivotally connected to the right side arm.

The seat support frame can comprise a cross arm and left and right arms extending from the cross arm. The left arm is pivotally connected to the front left leg and the left hinge lock and the right arm is pivotally connected to the front right leg and the right hinge lock.

The push arms can be pivotally connected to the hinge locks. The left push arm and the left arms can be pivotally connected to the left hinge lock about a common axis, and the right push arm and the right arm are pivotally connected to the right hinge lock about a common axis. The left and right arms can extend rearwardly beyond the common axes of the left and right hinge locks. The portion of the seat support frame that pivots downwardly when the frame is folded can include the left and right arms extending beyond the common axes. The cross arm can connect the ends of left and right arms extending beyond the common axes.

The handlebar frame can comprise a handlebar and left and right push arms connected to the handle bar. Specifically, the handlebar can be pivotally connected to the left and right push arms respectively about left and right pivot assemblies. The handlebar can be pivotally movable to reduce the length of the handlebar frame during storage.

According to one aspect of the present invention, a canopy frame can be connected to the portion of the seat support frame that pivots downwardly so that as the stroller frame is folded, the portion of the seat support frame pivoting downwardly pulls the canopy frame downwardly. Specifically, the canopy frame can be pivotally connected to the left and right arms extending beyond the common axes. A portion of the canopy spaced furthest from the pivotal connection to the seat support frame can be positioned below the front tray, and can be positioned between the handlebar frame and the tray when the stroller is folded.

According to another aspect of the invention, the stroller or the stroller frame can include an upper tray mounted to the handlebar frame and a one-hand actuator for unlocking the left and right hinge locks mounted to the upper tray. The upper tray can have at least one container holding compartment and an opening for inserting operator's fingers. The actuator can be mounted to the underside of the upper tray for a movement between a pushed, actuated position and un-actuated position.

The stroller can further include left and right hinge-lock actuating members movably mounted to the left and right push arms and operatively connected respectively to the left and right hinge locks. The actuator can comprise a handle and left and right linkage assemblies connecting the handle to the left and right actuating members. Each of the left and right linkage assemblies can comprise a substantially U-shaped cross linkage and a push rod connected to the cross linkage. The cross linkage can have first, second, and third arms. The third arm can be pivotally journaled to the underside of the upper tray and join the first and second arms. The first arm can connect to one side of the handle and the second arm can pivotally connect to the push rod, which can connect to the respective left or right actuating member.

According to another aspect of the invention, the stroller can include an infant carrier securing mechanism connected to the handlebar frame, or alternatively, means for mounting an infant carrier in a rearwardly facing direction and providing at least two recline positions. The securing mechanism is adapted to engage front portions of the infant carrier to provide the two recline positions.

The securing mechanism can comprise a plurality of stops movably mounted to the left and right push arms. Each stop can be rotatably mounted between an engage position and a disengage position, which is rotated away from the engage position. There can be a pair of lower stops and a pair of upper stops, respectively mounted rotatably to the left and right push arms. The infant carrier can be adapted to engage the lower stops to provide a first recline position for the infant carrier and can be adapted to engage the upper stops and the lower stops to provide a second reline position, which can be more reclined than the first position.

Another aspect of the invention resides in a method of retracting a canopy of a stroller when it is folded, comprising providing a foldable stroller of the type described above and mounting a canopy frame to the portion of the seat support frame that pivots downwardly so that, as the stroller frame is being folded, the seat support frame pivoting downwardly pulls down the canopy frame.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

DETAILED DESCRIPTION

Although references are made here to directions in describing the structure, they are made relative to the drawings (as normally viewed) for convenience. The directions, such as left, right, upper, lower, inward, outward, etc., are not intended to be taken literally or limit the present invention in any form. Moreover, the numerical nomenclatures, first, second, third, fourth, etc., are used solely for purposes of tracking the structural elements. These numerical nomenclatures are not intended to be taken literally or to limit their associated elements.

Figure 1:
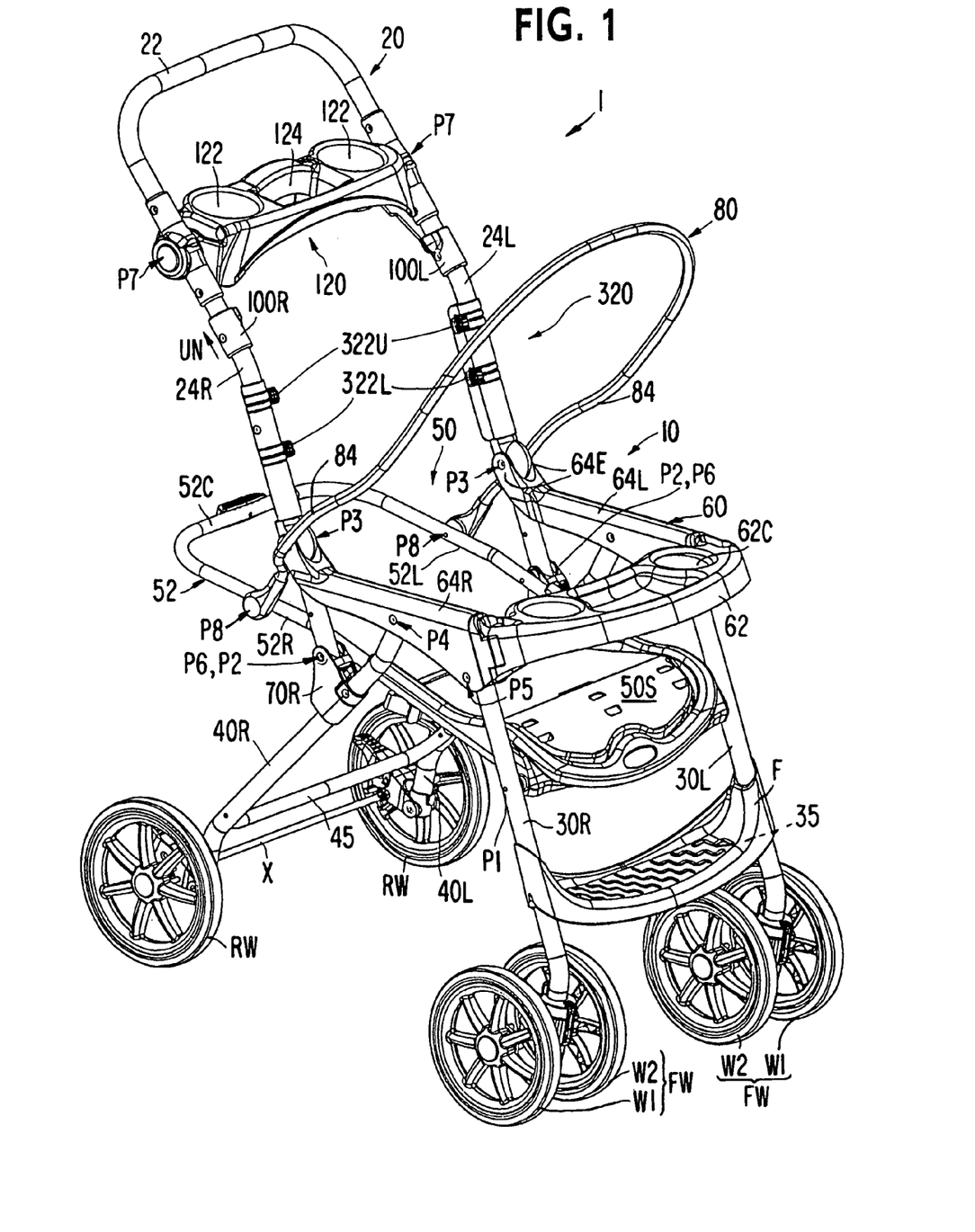
FIG. 1 is a perspective view of a foldable stroller in its operating position, with the soft goods removed to reveal a stroller frame.
Figure 1A:
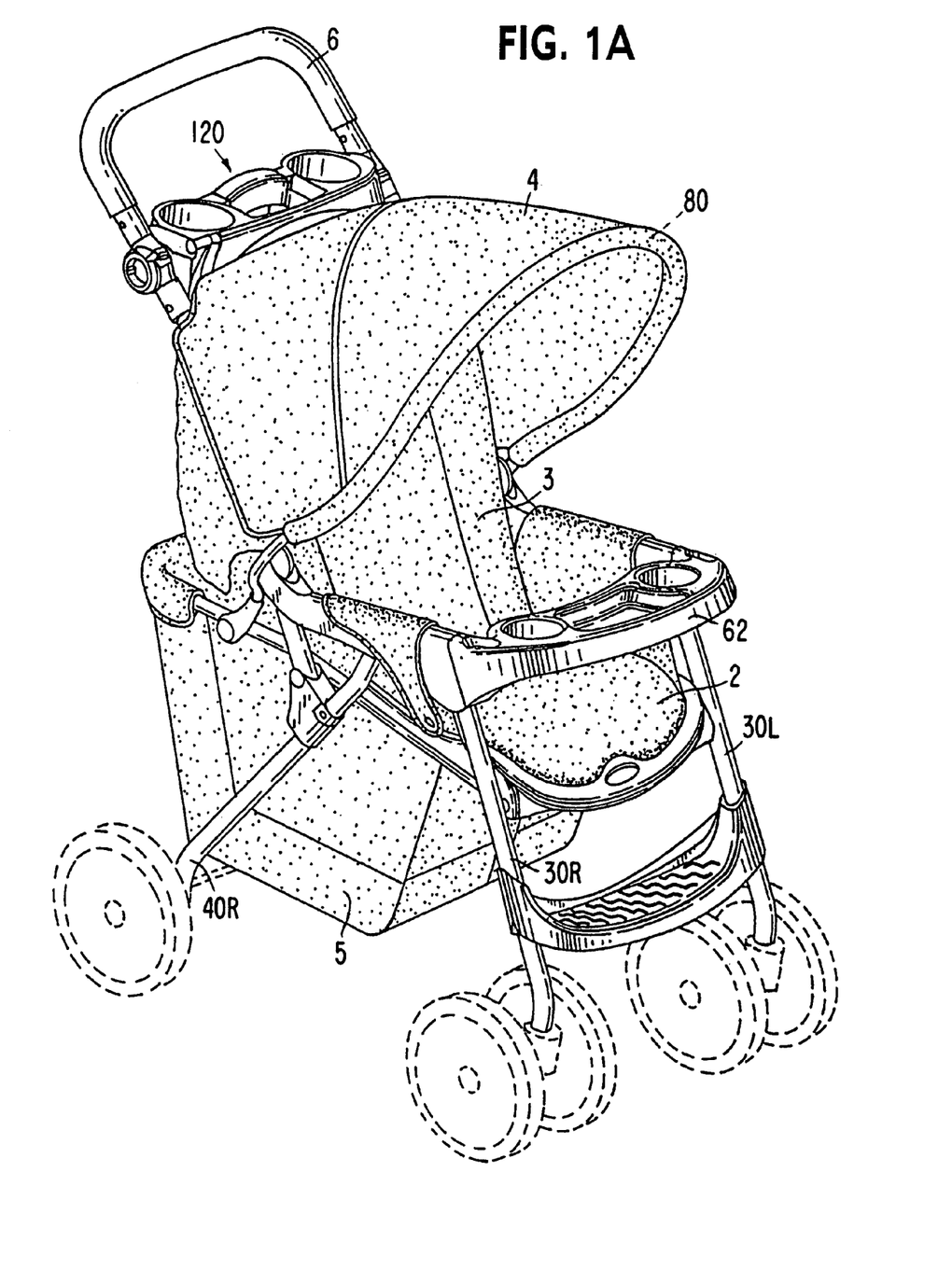
FIG. 1A is a perspective view a foldable stroller of FIG. 1 with the soft goods in place.

FIG. 1 shows the perspective view of the foldable stroller 1 according to one embodiment of the present invention. To more clearly reveal the stroller frame 10, the stroller 1 (in FIGS. 1 and 2–6) is shown without the associated "soft goods," such a seat cushion 2, seat back support 3, canopy 4, basket 5, hand grip 6, etc., which are typically made of cloth or plastic or both, or a flexible material. The stroller 1 with the soft goods in place is shown in FIG. 1A. The stroller 1 is generally intended for transporting children, but the inventive principles can be applied to all types of wheeled transports, including carts or carriages having a foldable frame.

Figure 2:
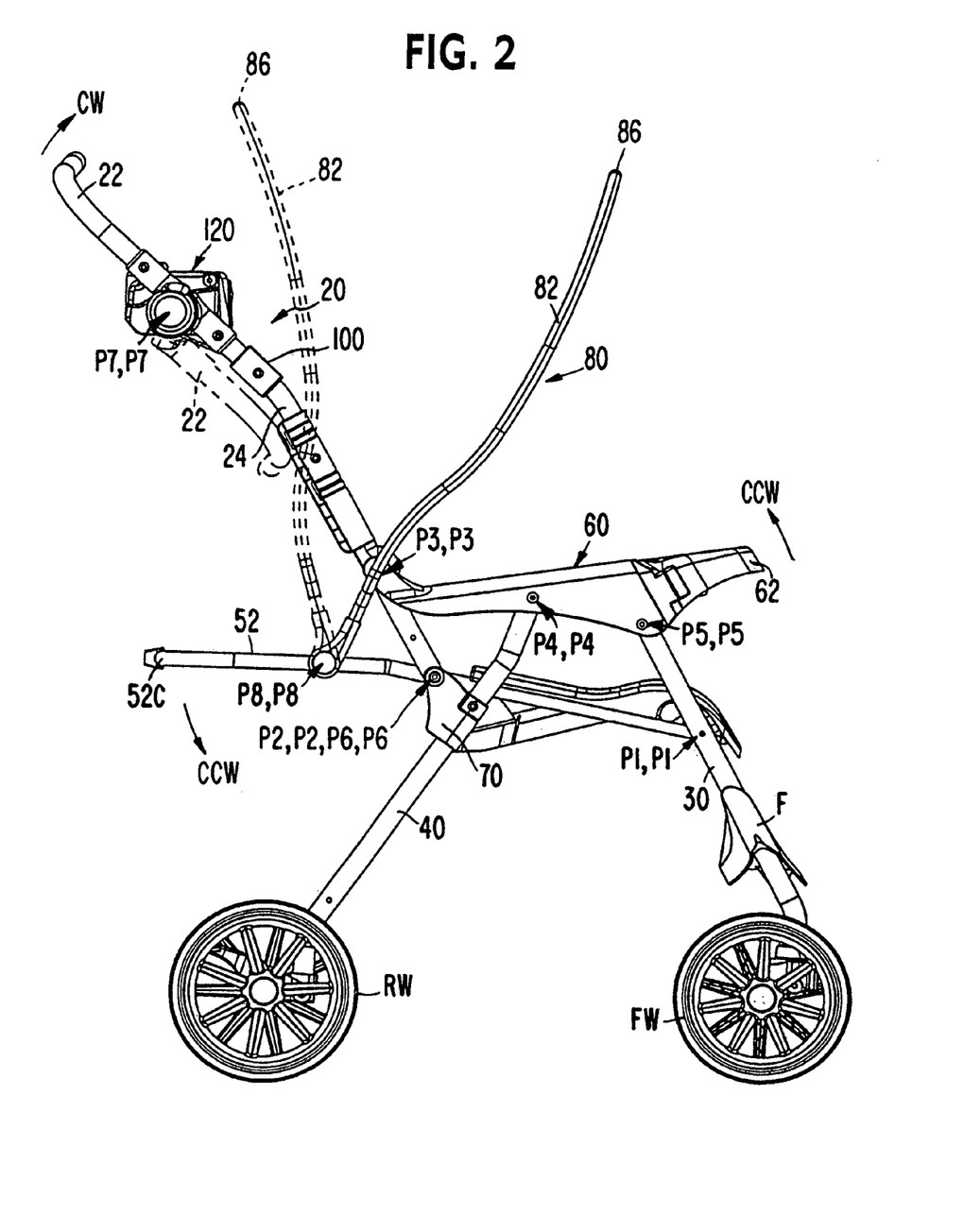
FIG. 2 is a side view of the foldable stroller of FIG. 1.
Figure 3:
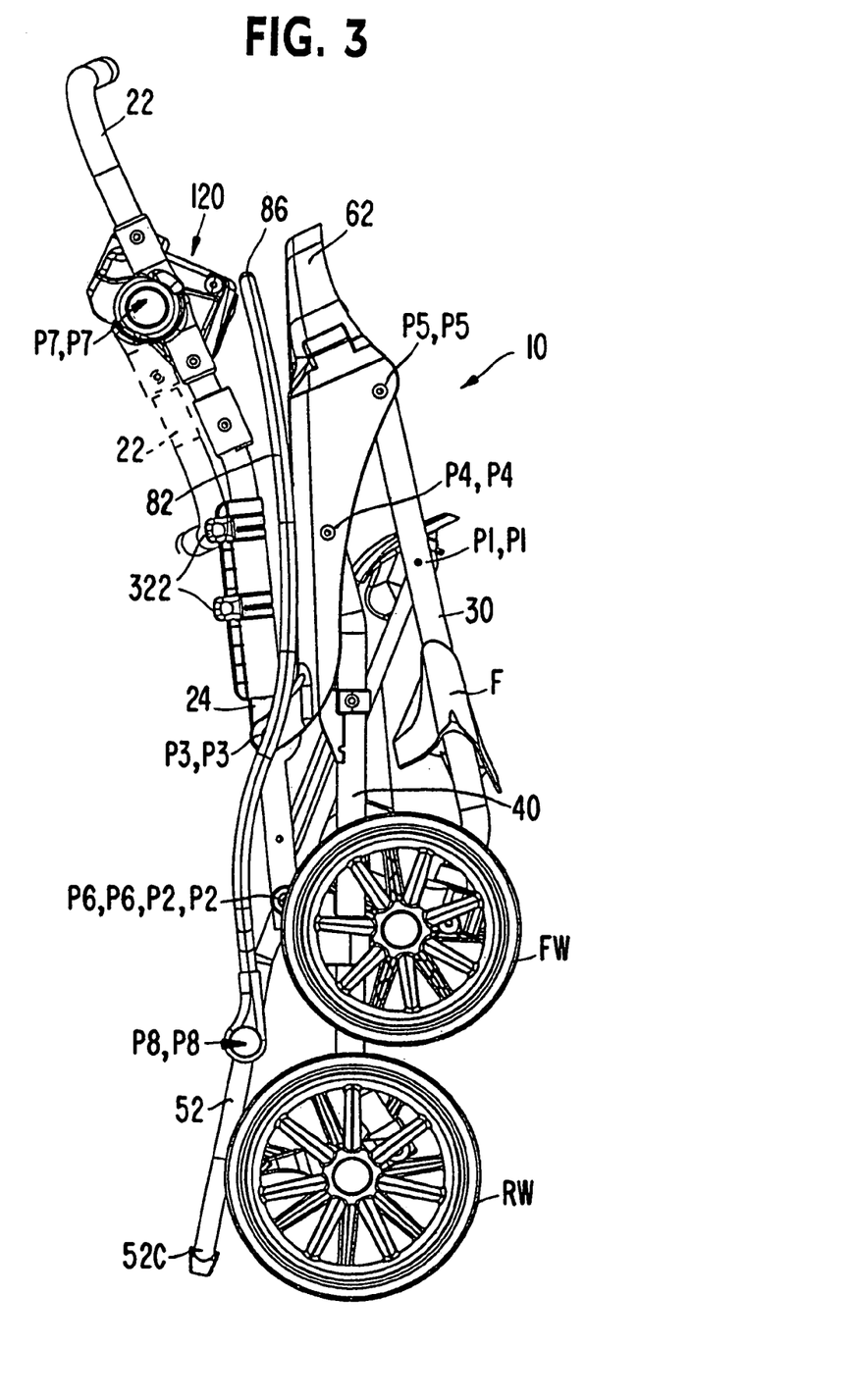
FIG. 3 is a side view of the foldable stroller of FIG. 1 in the folded position.

The stroller 1 includes a stroller frame 10 that is convertible between an operating or use position (shown in FIGS. 1, 1A, and 2), and a folded or stowed position (shown in FIG. 3). In the folded position, the stroller 1 is folded to a generally flattened configuration for storage. In the operating position, the stroller 1 is configured to receive and transport a passenger in a manner well understood by those skilled in the art.

Referring to FIGS. 1 and 2, the stroller frame 10 can have the basic fundamental frame configuration, similar to the ones identified previously in U.S. Pat. Nos. 6,155,740; 5,511,441; 5,181,735; and 4,953,887, the disclosures of which are incorporated herein by reference. The stroller frame 10 according the present invention includes a handlebar frame 20, legs 30R, 30L, 40R, 40L, a passenger support or frame 50, a tray assembly 60, and a pair of hinge locks 70. In the drawings, a letter "P" or "Px" (where x represents a number) designates a pivotal connection, a pivot, or pivotal mount, or any conventional pivoting configuration, which can include pins, shaft, bolt, rivet, bearings, etc.

The handlebar frame 20 comprises a handlebar 22 and right and left push arms 24R, 24L (collectively 24) extending from the handlebar 22. The handlebar 22 and the push arms 24 form a generally U-shaped frame. The handlebar 22 can be ergonomically configured for comfort, such as described in U.S. Pat. Nos. 5,454,584 and 5,605,409 issued to Haut, et al., the disclosures of which are incorporated herein by reference. The handlebar frame 20 can include an angle adjuster for pivotally positioning the handlebar 22 relative to the push arms 24. The inner operative workings of the angle adjuster is omitted for brevity, particularly since any known angle adjuster can be used, such as the ones disclosed in aforementioned U.S. Pat. No. 5,184,835 issued to Huang and U.S. Pat. No. 5,056,805 issued to Wang, the disclosures of which are incorporated herein by reference. In the present embodiment, the angle adjuster is adapted to provide a greater rotation capability so that the handlebar can be flipped over close to the push arms 24, as shown in phantom in FIG. 3.

The legs 30R, 30L, 40R, 40L can be described in terms of front legs 30, which include a front right (FR) leg 30R and a front left (FL) leg 30L, and rear legs 40, which include a rear right (RR) leg 40R and a rear left (RL) leg 40L. Each leg 30R, 30L, 40R, 40L has a lower end to which at least one rotatable wheel W is mounted. As shown, the front legs 30 each can have a pair of rotatable front wheels W1, W2 (collectively FW). The rear legs 40 can be reinforced with a cross brace 45, which extends between the rear wheels RW, above the rear wheel axle X. Similarly, the front legs 30 can be reinforced with a cross brace 35 (hidden inside the foot rest F) extending between the front wheels W.

The passenger support 50 includes a substantially U-shaped seat support frame 52. A back support (not shown), which can comprise a soft good (fabric) or frame type with a reclining latch (not shown), can be connected to the seat support frame 52. The seat support frame 52 has a cross arm 52C joined to left and right arms 52L, 52R. The seat support frame arms 52L, 52R are pivotally mounted to the respective front legs 30L, 30R at pivots P1, and are pivotally mounted to the hinge locks 70 at pivots P2, as better illustrated in FIG. 2. The hinge locks 70 are fixedly mounted to the rear legs 40. Accordingly, the seat support frame arms 52L. 52R are operatively connected pivotally to the rear legs 40. The support 50 can further include a seat 50S secured to the seat support frame arms 52L, 52R.

A portion of the seat support frame 52 protrudes beyond the pivoting connection P2 of the rear legs 40 (or the hinge locks) to the support frame arms 52L, 52R, as shown in FIG. 2. A storage basket or the like (not shown) can hang from the seat support frame 52, and hence sometimes referred to as a basket frame, for storing various sundry items, including diapers, bottles, blankets, bibs, and other child-related items.

The tray assembly 60, which can have a U-shaped configuration as shown in FIG. 1, comprises a tray 62, and left and right side arms 64L, 64R (collectively 64) pivotally connected respectively to the left and right push arms 24L, 24R at pivots P3. Specifically, referring to FIG. 1, the distal (rear) end of each of the side arms 64 has a pair of spaced ears 64E or the like that are spaced apart to receive the respective push arm 24L, 24R, and are held pivotally together with pivots P3. The tray 62, which can have one or more cup or container holding compartments 62C, can be either fixedly formed with the side arms 64, detachably mounted to the side arms 64, such as disclosed in U.S. Pat. No. 4,856,809, the disclosure of which is incorporated herein by reference, or pivotally connected or hinged to one side of the side arms 64L, 64R, while the opposite side can be latched to the other of the side arms 64L, 64R. In the third option, the tray 62 can also be rotatably mounted to the one side arms 64L, 64R, thus creating two axes of rotation. The tray 62 can be opened (pivoted along one substantially extending axis) and rotated about a second axis to tuck the tray 62 alongside the respective front legs 30R, 30L. Moreover, any conventional attaching means can be contemplated for detachably or movably attaching the tray 62 to the side arms 64.

The front and rear legs 30, 40 are pivotally mounted to the tray assembly 60. Specifically, the upper end of the front and rear legs 30, 40 are pivotally mounted to the respective side arms 64 with pivots P4, P5, respectively.

The hinge locks 70 (left 70L, right 70R) pivotally mount the handlebar frame 20 to the rear legs 40 at pivots P6. The hinge locks 70 can be any conventional hinge lock for maintaining a fixed position between the rear legs 40 and the handlebar frame 20 when locked, and for allowing pivotal motion therebetween when unlocked. For instance, the left and right hinge locks 70L, 70R each can be fixedly attached to and positioned between the ends of the respective rear leg 40L, 40R. The ends of the respective left- and right-side push arms 24 can be pivotally mounted to the respective hinge locks 70 at pivots P6 (which can share common pivots with pivots P2). To lock the handlebar frame 20 to the rear legs 40, each hinge lock 70 can include, for instance, a plunger or the like (not shown) that is movably mounted inside the handlebar frame 20, or a latch (not shown) that is pivotally mounted to the handlebar frame 20. The plunger can be biased inwardly into the respective hinge lock 70L, 70R or the latch can be biased to hook onto a fixed portion of the respective hinge lock 70L, 70R to lock the handlebar frame 20 to the rear legs 40. Alternatively, the hinge lock 70 can be configured as disclosed in previously mentioned U.S. Pat. No. 6,155,740 issued to Hartenstine, or U.S. Pat. No. 5,110,150 issued to Chen, the disclosures of which are incorporated herein by reference.

A pair of remote actuating members 100L, 100R (collectively 100) or the like can be operatively connected to the hinge locks 70, such as with a cable or rod (not shown). Each of the left and right actuating members 100L, 100R are slidably mounted to the respective left and right push arms 24L, 24R. Pulling each of the remote actuating members 100L, 100R upwardly along the respective left and right push arms 24L, 24R actuates the respective hinge lock 70L, 70R, e.g., moves the plungers upwardly into the push arms 24 or disengage the latch.

To unlock the stroller frame 10 from the operating position to the folded position, the operator can slide both remote actuating members 100 along the push arms 24 in the direction of arrow UN (see FIG. 2), which unlocks the hinge locks 70. Once the hinge locks 70 are unlocked, the stroller can be folded, for example, by pivoting the tray assembly 60 about the handlebar frame 20, in the counterclockwise direction CCW (FIG. 2), which raises the tray 62 upwardly to the folded position (FIG. 3), while lowering the cross arm (distal end portion) 52C of the seat support frame 52.

Upper Tray/Hinge Lock Actuator

Figure 4:
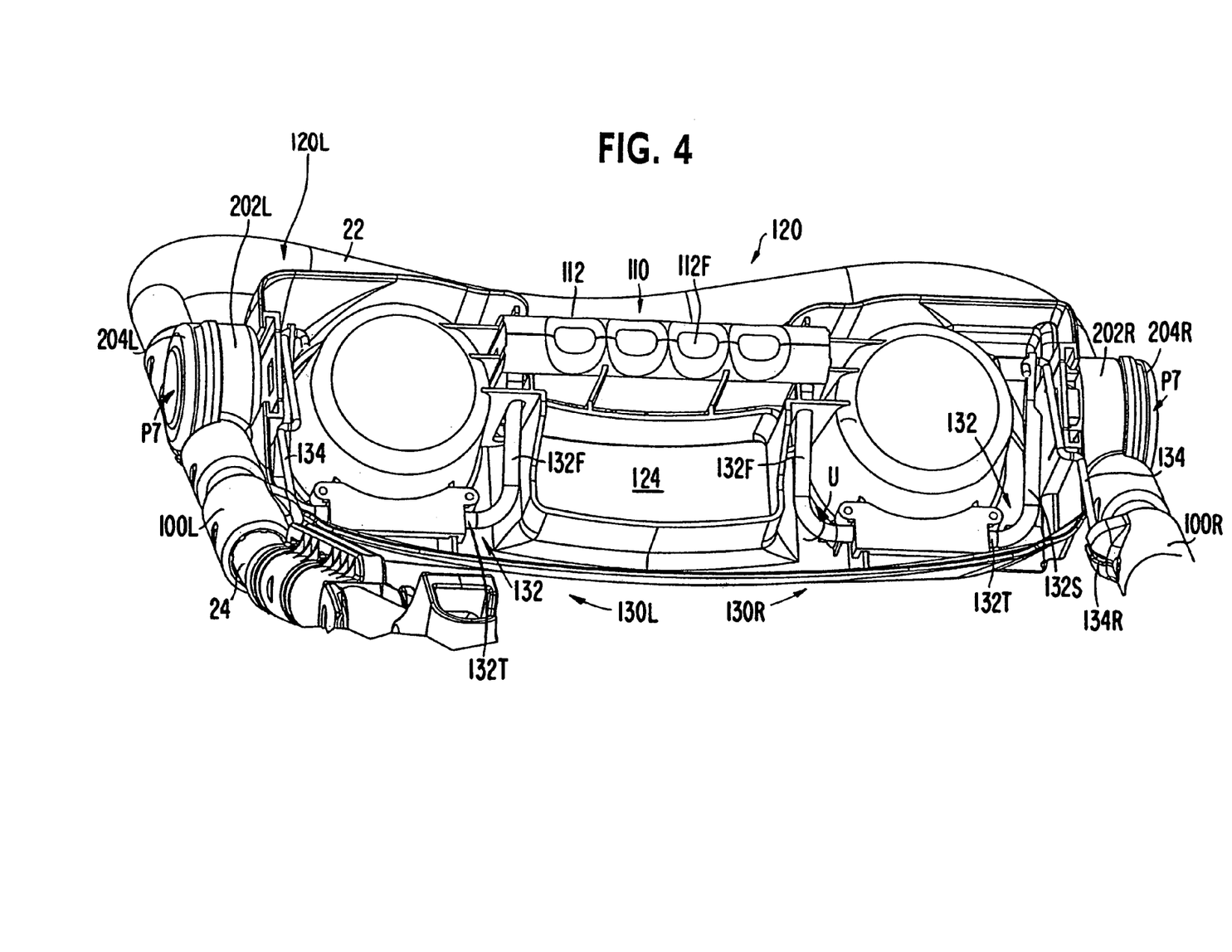
FIG. 4 is a detailed perspective view of a parent tray and a remote hinge-lock actuator.

Referring to FIG. 4, the stroller also can include a one-hand hinge-lock actuator 110, which is connected to the remote actuating members 100. According to one aspect of the present invention, the hinge-lock actuator 110 can be formed with an upper tray 120, which is connected to the handlebar frame 20. The upper tray 120 comprises at least one recessed compartment, such as a cup or container holding recess 122. The illustrated embodiment shows two cup or container holding compartments 122 and a through-hole 124, which permits the operator's hand or fingers to be inserted therethrough.

The tray 120 can be mounted to the push arms 24 or to the angle adjuster about pivots P7. Specifically, the angle adjuster can have a fixed pivot member 202L, 202R (collectively 202) extending from each upper end of the left and right push arms 24L, 24R and a movable pivot member 204L, 204R (collectively 204) extending from each lower end of the handlebar 22. The fixed pivot members 202 are positioned facing each other, i.e., positioned inwardly of the respective movable pivot members 204. The fixed pivot members 202 can have tracks, sockets, or any mechanical connectors that can receive complementary mating parts formed on the left and right sides 120L, 120R of the tray 102.

The remote hinge-lock actuator 110 comprises a handle 112 and left and right linkage assemblies 130L, 130R (collectively 130). The handle 112 is mounted for a movement between an actuated or pushed position, which pulls up the actuating members 100 to release the hinge locks 70, and a non-actuated or locked position, where the actuating members 100 are at their normal, down position (hinge locks 70 remain locked). The handle 112 can be biased toward the non-actuated (locked) position, and can include finger contours 112F. Either hand of the operator can be inserted into the through-hole 124 so that the fingers loop around the finger contours 112F. To actuate or release the hinge locks 70, the operator presses or pulls up the handle 112 with his or her fingers.

Still referring to FIG. 4, the right and left linkage assemblies 130L, 130R are substantially identical, mirror images of each other. Each of the right and left linkage assemblies 130L, 130R comprises a cross linkage 132 connected to a push rod 134. The cross linkage 132 is substantially U-shaped, having a first arm 132F and a second arm 132S spaced from the first arm 132F and joined by a third arm 132T. The first arm 132F is connected to one side of the handle 112 and the second arm 132S is pivotally connected to the push rod 134. The third arm 132T is pivotally journaled to the underside of the tray 120. Actuating the handle 112 simultaneously rotates the left and right cross linkages 132 in the direction of the arrow U (pivots toward the upper side of the tray 120). One end of the push rod 134 is pivotally connected to the free end of the second arm 132S, and the other end is pivotally secured to the respective actuating members 100L, 100R. In this respect, each of the actuating members 100L, 100R has a push rod receptacle 134R configured to receive and hook (or latch) onto the respective push rod 134. As the operator pushes the handle 112, both the left and right cross linkages 132 rotate, which pull up the respective left and right push rods 134, and thus the actuating members 100L, 100R and allow the handlebar frame 20 to pivot relative to the hinge locks 70.

Canopy Frame

According to another aspect of the present invention, the stroller includes a canopy support rod or frame 80 attached to the seat support frame or basket frame 52 at pivots P8. The frame 80 comprises one or more substantially U-shaped canopy bows 82 (only one shown) that support a canopy and pivotally or movably attached to the set support frame 52. In this respect, any conventional bow mounting system can be used. The canopy frame 80 can be moved between a use position (solid in FIG. 2) for shading a passenger and a stow position (phantom in FIG. 2) where it is pulled close to the handlebar frame, away from the passenger. The canopy bow(s) 82 is pivotally attached at the pivots P8, which is located on the portion 52B of the seat support frame extending beyond the pivots P2, P6. In this respect, the canopy bow 82 can have outwardly extending bulge 84 to provide clearance for the push arms 24.

When the stroller is being folded from the operating position shown in FIG. 2 to the folded position shown in FIG. 3, the distal end (cross arm 52C) of the seat support frame 52 rotates counterclockwise CCW, toward the rear wheels RW, while the handlebar frame 20 rotates clockwise CW. This lowering action of the support frame 52 retracts the bow 82 downwardly and automatically positions the bow 82 close to the handlebar frame 20. It should be noted that the canopy 4 can be mounted around the handle frame 20. Thus, moving the handlebar frame 20 pivots the canopy frame 80 to the position shown in phantom when the stroller is folded. But because the canopy frame 80 is retracted when the stroller is fully folded (FIG. 3), the bow 82 is tucked in between the handlebar frame 20 and the tray assembly 60.

The area (crest) 86 of the bow furthest from the pivots P8 can be located higher than the handlebar 22, as shown in FIG. 2 when the stroller is in the operating position. Nonetheless, because of the present unique mounting of the canopy frame 80, the crest 86 of the bow can extend well below the handle bar 22, as shown in FIG. 3. In this respect, it is preferable for the crest 86 to be positioned inwardly from the front end of the tray to protect the canopy 4.

It is further desirable to make the stroller as compact as feasible when it is folded. According to the present invention, the handlebar 22 is made foldable about the pivots P8 as shown in phantom in FIG. 3. By pivoting the handlebar 22 in the counterclockwise direction, the handlebar 22 is no longer the highest or longest point of the folded stroller, and the overall length of the folded stroller can be considerably reduced.

Infant Carrier Mount

Figure 5:
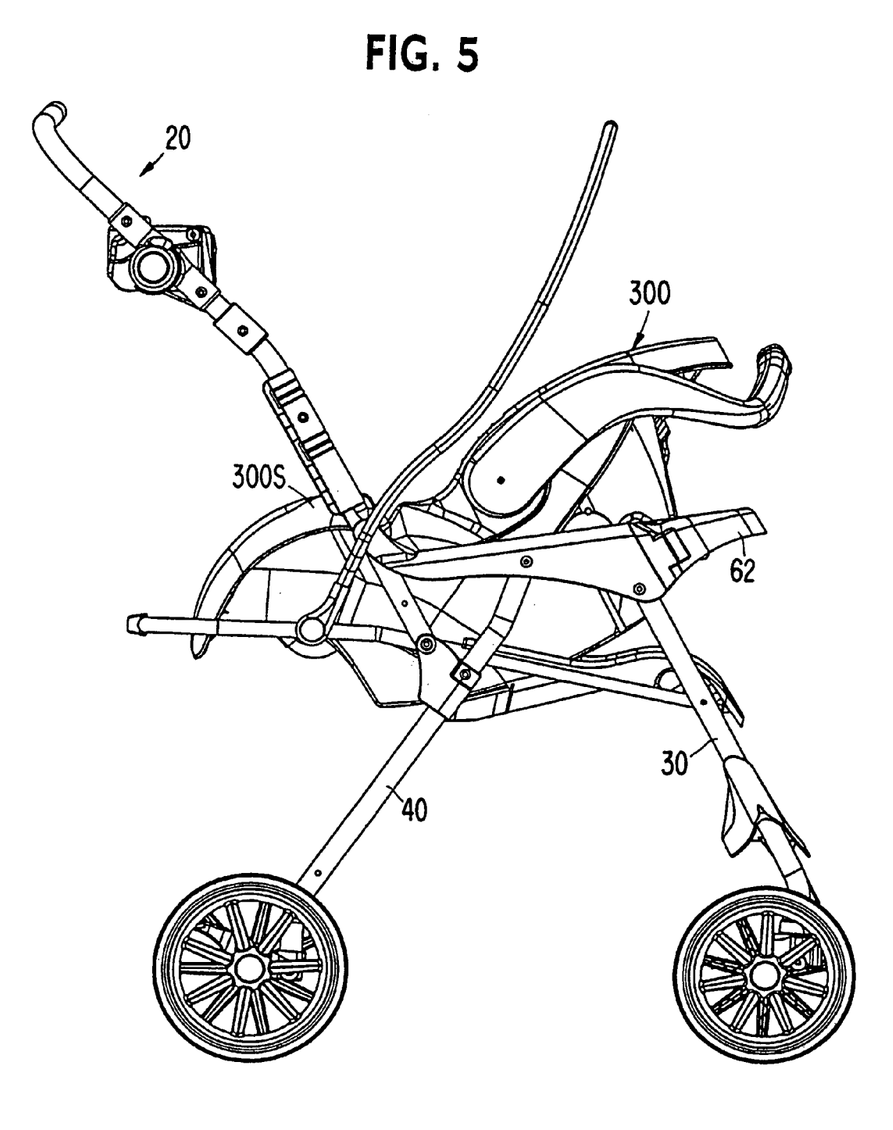
FIG. 5 is a side view of the foldable stroller of FIG. 1, with an infant car carrier mounted thereto and positioned at an infant upright position.
Figure 6:
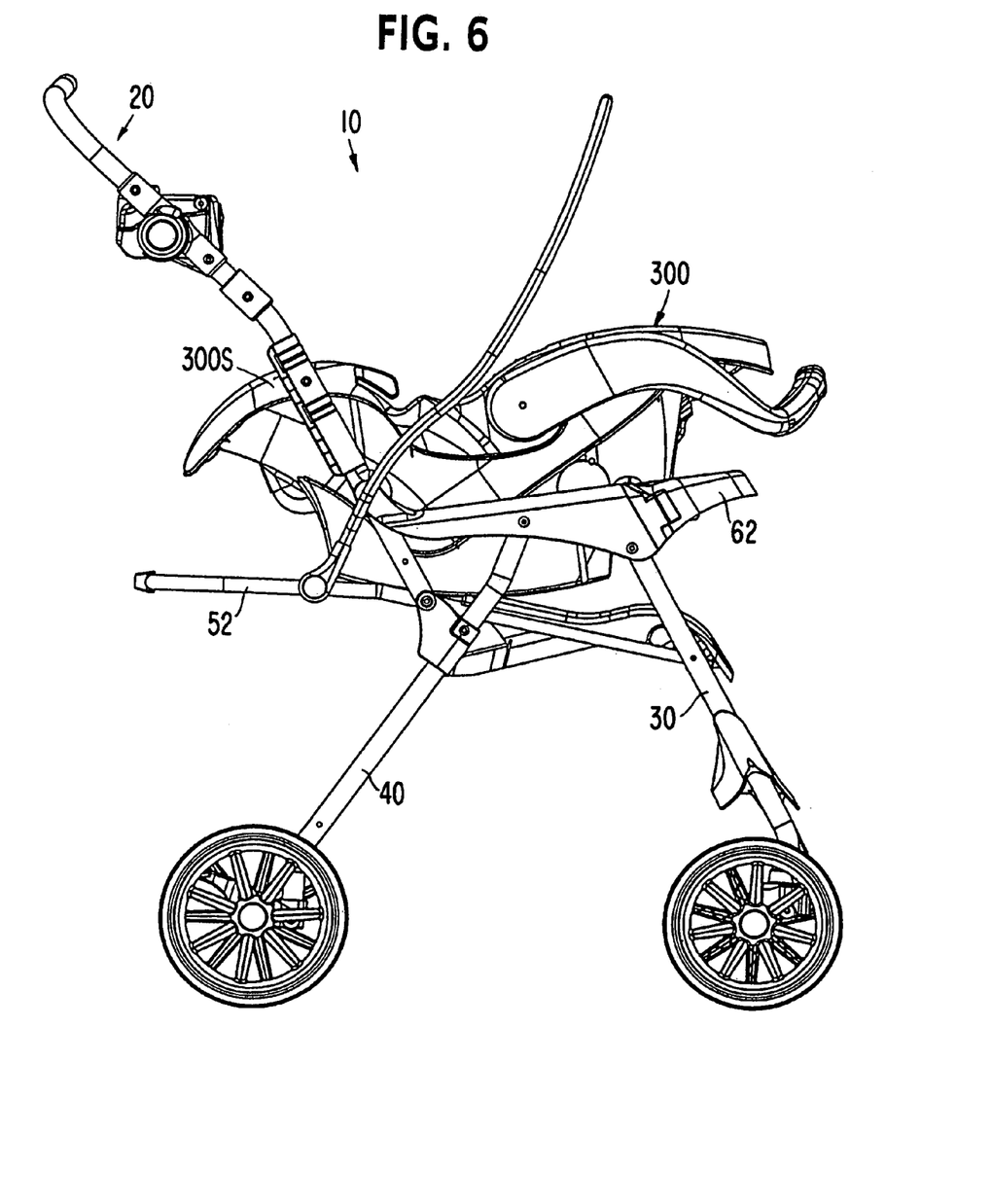
FIG. 6 is a side view of the foldable stroller of FIG. 1, with the infant carrier mounted thereto and positioned at an infant reclined position.

FIGS. 5 and 6 illustrate the present stroller 1 with an infant carrier 300 mounted thereto. According to another aspect of the invention, the stroller 1 provides at least two tilt positions, reclined and upright, while the infant carrier is rearwardly facing. In this respect, the infant carrier 300 can be mounted to the tray as described in U.S. Pat. No. 6,070,890, the disclosure of which is incorporated herein by reference. That is, the front tray 62 can have a notch or the like (not shown) that can latch onto a retractable catch or the like (not shown) formed on the underside of the infant carrier. The handlebar frame 20 carries infant carrier securing mechanism 320, which comprises a plurality of abutments or stops 322 (322U, 322L) rotatably mounted to the left and right push arms 24L, 24R. The stops 322 are rotatable between an engage position shown in FIG. 1 and a disengage position rotated away from the engage position. The present embodiment has four stops, a pair of lower stops 322L and a pair of upper stops 322U.

Referring to FIG. 5, the carrier 300 is seated so that it is rearwardly facing (facing the caregiver) and is positioned in an upright position. In this position, the lower stops 322L are rotated to the engage position to abut the upper front left and right sides 300S of the infant carrier. The lower stops 322L are rotated toward each other after the infant carrier 300 is placed in position. In this position, the front part of the infant carrier 300 is supported by the seat support 50S (and the associated seat cushion 2 and the lower stops 322L) and the lower stops 322L confine the infant carrier from being lifted upwardly.

Referring to FIG. 6, to position the infant carrier in the more reclined position, the lower stops 322L are rotated so that they face each other, as shown in FIG. 1. The infant carrier 300 rests on the front tray 62 and the lower stops 322L. Once the infant carrier 300 is positioned, the upper stops 322U are rotated so that they abut against the upper surface of the upper front left and right sides 300S of the carrier. The lower stops 322L prevent the infant carrier 300 from moving downwardly to the seat 2 and the upper stops 322U prevent the infant carrier 300 from being lifted upwardly. This thus keeps the carrier locked onto the stroller.

Figure 7:
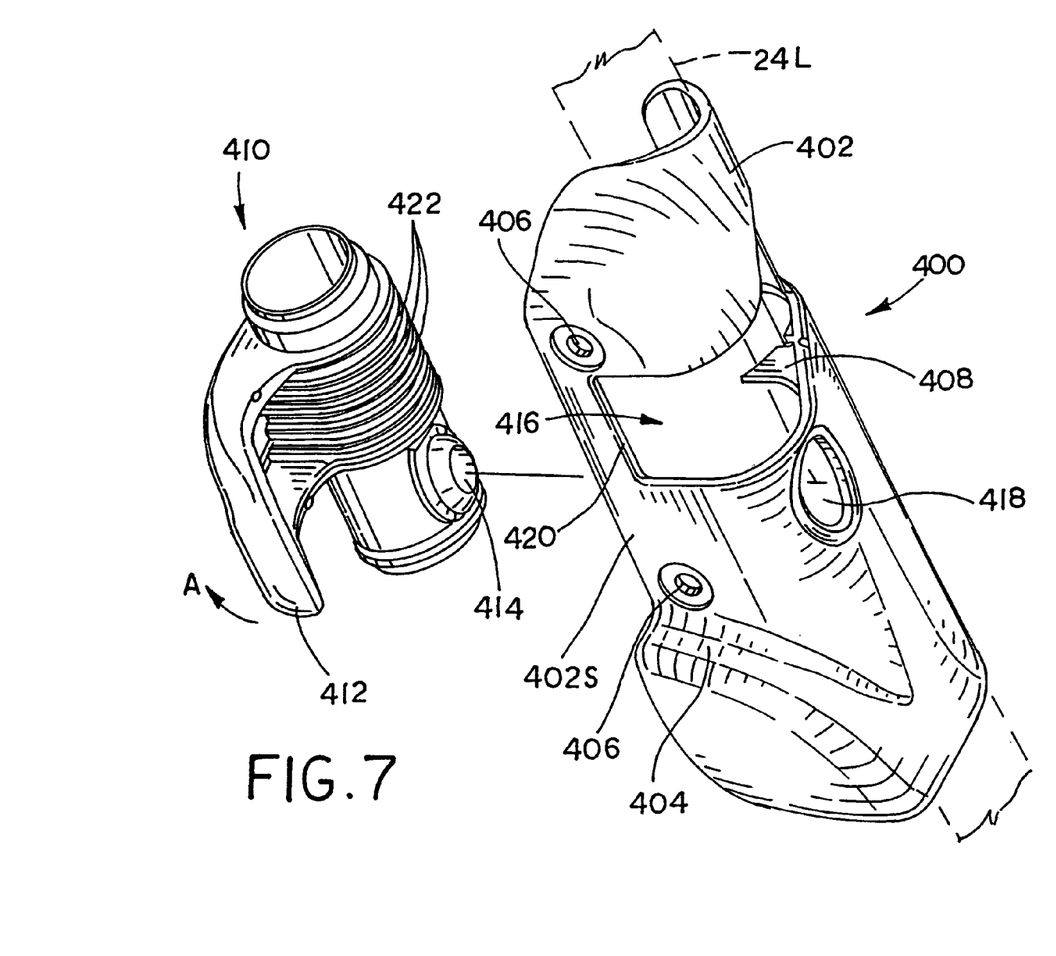
FIG. 7 is a detailed, exploded, perspective view of an embodiment of an infant carrier securing mechanism.

FIG. 7 illustrates an alternative infant carrier securing mechanism 400 for use on a stroller. Such an infant carrier securing mechanism 400 is mounted to each of the left and right push arms 24L, 24R of the stroller. The infant carrier securing mechanism 400 includes a housing 402 having a carrier supporting surface 404. When an infant carrier is mounted to the stroller, the lower surfaces of the front left and right sides 300S of the carrier (see FIG. 5) rest on the respective carrier supporting surfaces 404. The housing 402 is riveted to the respective push arm 24L, 24R at rivet holes 406 such that surface 402S of the housing 402 faces the interior of the stroller. FIG. 7 shows two rivet holes on surface 402S; two additional rivet holes extend through the housing surface opposite surface 402S.

The infant carrier securing mechanism also includes a stop 410 movably mounted within the housing 402. The stop 410 is mounted to ribs on the underside of the housing 402; one rib 408 is shown in FIG. 7. The stop 410 includes an extension 412 and a button 414. The extension 412 extends through slot 416 in the housing 402 and can move between an engage position and a disengage position rotated away from the engage position. The button 414 extends through an aperture 418 in the housing 402 when the stop is in the engage position. Although stop 410 of FIG. 7 includes ribs 422, these ribs 422 need not be present.

To secure an infant carrier to the stroller, a user can move the extension 412 along slot 416 in the direction of arrow A toward the interior of the stroller until the extension 412 abuts surface 420 of the housing 402. In this position, the button 414 extends through aperture 418, and the respective front side 300S of the carrier is held between the stop extension 412 and the carrier supporting surface 404. To remove the infant carrier from the stroller, the user depresses button 414 and rotates stop extension 412 along slot 416 in a direction away from the interior of the stroller, opposite the direction of arrow A.

An advantage of infant carrier securing mechanism 400 is that it provides a positive button engagement that a user can hear and can see. These visual and audible cues enable the user to confirm that the stop 410 is in the engage position.

It will be understood that, in an alternative embodiment of the invention, an infant carrier securing mechanism, for example, mechanism 320 or mechanism 400, is mounted to only one of the left and right push arms 24L, 24R of the stroller. The single infant carrier securing mechanism securely locks the infant carrier to the stroller.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

We claim:

1. A foldable stroller adapted for movement over a surface, comprising:
   a frame convertible between an operating position and a folded position, the frame including at least one front leg, at least one rear leg, a handlebar frame, and a seat support frame extending between the at least one front leg and the at least one rear leg, the seat support frame having a portion that pivots toward the surface when the frame is folded; and
   a canopy frame movably connected to the seat support frame,
   wherein as the frame is folded, the seat support frame pulls the canopy frame toward the surface.

2. A stroller according to claim 1, wherein the at least one rear leg includes rear left and right legs, wherein the frame further includes left and right hinge locks fixedly mounted respectively to the rear left and right legs, wherein the handlebar frame is pivotally connected to the rear left and right legs, and wherein ends of the handlebar frame are pivotally connected to the left and right hinge locks.

3. A stroller according to claim 1, wherein the at least one rear leg includes rear left and right legs, wherein the frame further includes left and right hinge locks fixedly mounted respectively to the rear left and right legs, and wherein the stroller further includes an upper tray mounted to the frame and a one-hand actuator for unlocking the left and right hinge locks mounted to the upper tray.

4. A stroller according to claim 1, wherein the frame further includes left and right push arms, and wherein the stroller further includes an infant carrier securing mechanism including at least one stop movably mounted to at least one of the left and right push arms and adapted to engage front portions of an infant carrier to removably mount the infant carrier in a rearwardly facing direction, the stop being rotatable about the push arm between an engage position and a disengage position.

5. A foldable stroller comprising:
   a frame convertible between an operating position and a folded position, the frame having rear left and right legs and left and right hinge locks fixedly mounted respectively to the rear left and right legs;
   an upper tray mounted to the frame at a fixed location relative to the frame; and
   a one-hand actuator for unlocking the left and right hinge locks mounted to the upper tray,
   wherein the upper tray has at least one container holding compartment and an opening for inserting operator's fingers, the actuator being mounted to an underside of the upper tray for a movement between an actuated position and un-actuated position.

6. A stroller according to claim 5, wherein the frame includes left and right push arms and a handlebar pivotally connected to the left and right push arms about left and right pivot assemblies, the upper tray being connected to the left and right pivot assemblies.

7. A stroller according to claim 6, further including left and right hinge-lock actuating members movably mounted to the left and right push arms, the left and right hinge-lock actuating members being operatively connected respectively to the left and right hinge locks.

8. A stroller according to claim 7, wherein the actuator includes a handle and left and right linkage assemblies connecting the handle to the left and right actuating members.

9. A stroller according to claim 8, wherein each of the left and right linkage assemblies comprises a substantially U-shaped cross linkage and a push rod connected to the cross linkage, the cross linkage having first, second, and third arms, the third arm being pivotally journaled to the underside of the upper tray and joining the first and second arms, the first arm being connected to one side of the handle and the second arm being pivotally connected to the push rod, the push rod being connected to the respective left or right actuating member.

10. A stroller comprising:
    a frame including left and right push arms; and
    an infant carrier securing mechanism including at least one stop movably mounted to at least one of the left and right push arms and adapted to engage front portions of an infant carrier to removably mount the infant carrier in a rearwardly facing direction, the stop being rotatable about the push arm between an engage position and a disengage position.

11. A stroller according to claim 9, wherein the at least one stop includes a first stop movably mounted to the left push arm and a second stop movably mounted to the right push arm.

12. A stroller according to claim 9, wherein the at least one stop includes a lower stop and an upper stop, and the infant carrier is adapted to engage the lower stop to provide a first recline position and is adapted to engage the upper stop to provide a second recline position.

* * * * *